No. 740,848. PATENTED OCT. 6, 1903.
C. B. GORDON.
POT OF PASTE.
APPLICATION FILED DEC. 22, 1900.
NO MODEL.

WITNESSES: INVENTOR:
Charles B. Gordon
by his attys
Clarke & Raymond

No. 740,848. Patented October 6, 1903.

UNITED STATES PATENT OFFICE.

CHARLES B. GORDON, OF NEWTON, MASSACHUSETTS, ASSIGNOR TO THE CARTER'S INK COMPANY, OF BOSTON, MASSACHUSETTS, A CORPORATION OF MASSACHUSETTS.

POT OF PASTE.

SPECIFICATION forming part of Letters Patent No. 740,848, dated October 6, 1903.

Application filed December 22, 1900. Serial No. 40,776. (No model.)

*To all whom it may concern:*

Be it known that I, CHARLES B. GORDON, a citizen of the United States, residing at Newton, in the county of Middlesex and State of Massachusetts, have invented a new and useful Improvement in Pots of Paste, of which the following is a full, clear, and exact description, reference being had to the accompanying drawings, forming a part of this specification, in explaining its nature.

The invention relates to a pot of paste comprising a receptacle for holding the paste, the paste in the receptacle, and a water-well in the paste and receptacle, formed by making a hole in the paste and inserting in said hole a lining of waterproof paper, celluloid, or thin glass or similar material, the lower edge of which rests against the bottom of the pot or a disk of thin flexible or compressible material, the object of the invention being to provide the pot of paste with a simple, inexpensive, easily formed and applied chamber for containing water for supplying moisture to the paste and also for moistening the brush used in applying the paste.

Figure 1:
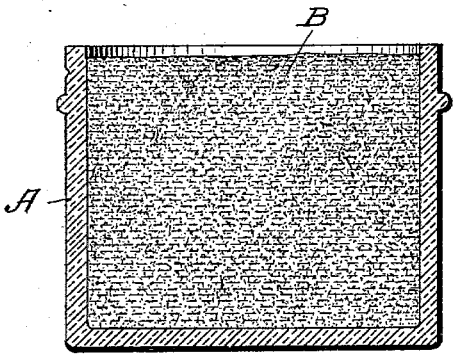
Figure 2:
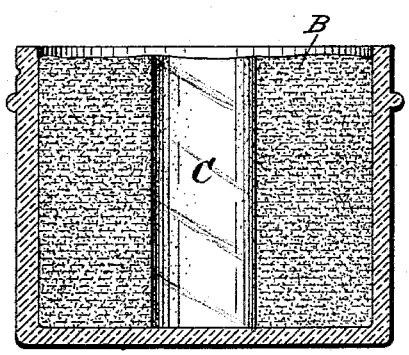
Figure 3:
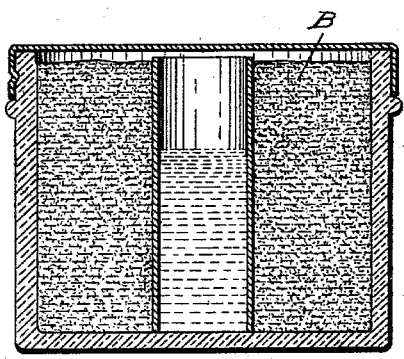
Figure 4:
Figure 5:
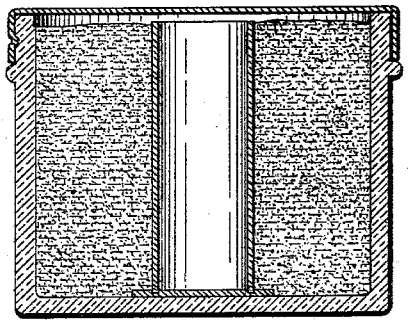

Referring to the drawings, Figure 1 is a view of a paste-jar filled with paste, the cover being removed and the hole not being formed in the paste. Fig. 2 is a view of the jar and paste after the hole has been formed. Fig. 3 is a view representing the jar as closed by a cap, the hole in the paste as lined and partially filled with water. Fig. 4 is a view in perspective of a tubular lining for the hole. Fig. 5 is a view of the jar, showing the lining as resting upon a thin base of soft or flexible material.

I will now describe the invention in connection with the drawings, where A represents the paste pot or jar; B, the paste contained in the pot or jar; C, the hole formed in the paste, extending from the top of the paste to the bottom of the pot or jar, centrally or otherwise located, formed after the paste has been poured into the pot or jar and become solidified by the removal of a portion thereof, or by molding the paste about a former, and which provides the paste in the pot with a hole, forming a chamber, the wall of which is paste. While a chamber thus formed and having such a wall will hold water without disintegrating the paste, still it is desirable in some instances that the wall of paste should be to some measure lined with a material less susceptible to the attack of the fluid than paste, and for this purpose I have formed a tubular lining, preferably open at both ends and of a very thin material, such as waterproof paper, thin celluloid, thin glass, or other equivalent material. The tube is of a diameter and height to snugly fit the hole and not extend appreciably above the upper surface of the paste. Its lower edge may abut against the bottom of the jar or pot, in which case the portion of the jar or pot within the edge will also act as the bottom of the well, or it may rest upon a thin base of soft or flexible material, like thin felt or rubber. This will serve to pack the joint between the lower edge of the lining and the bottom of the jar, rendering escape of water from the chamber beneath the lower end of the lining somewhere more difficult than where the end of the lining rests on the bottom of the jar. A chamber formed in this way answers all practical purposes, is cheap to make and apply, and its lining does not take up appreciable room in the jar. The lining is held in place by the friction of the paste upon its outer surface practically throughout its length.

I am aware of Letters Patent to Cragin, No. 630,302, and disclaim the invention therein described.

Having thus fully described my invention, I claim and desire to secure by Letters Patent of the United States—

1. As an improved article of manufacture, a pot or jar of paste comprising a paste-holding receptacle, a body of paste substantially solid at atmospheric temperature held in said receptacle, and a tube of thin material contained in said pot or jar, said tube forming a chamber therein entirely surrounded by paste and held from movement toward the inner walls of the pot or jar solely by the paste which surrounds it, as set forth.

2. The combination of a paste pot or jar containing paste having a hole extending from its upper surface to the bottom of the pot or jar, a foot of suitable material at the base of the hole and a lining of waterproof material in the form of a tube open at both ends contained in said hole with its lower edge on said foot.

CHARLES B. GORDON.

In presence of—
RICHARD B. CARTER,
P. W. CUTTING.